United States Patent [19]

Horike et al.

[11] Patent Number: 4,502,055

[45] Date of Patent: Feb. 26, 1985

[54] INK JET DEAERATION APPARATUS

[75] Inventors: Masanori Horike, Tokyo; Chuji Ishikawa, Kawasaki, both of Japan

[73] Assignee: Ricoh Company, Ltd., Tokyo, Japan

[21] Appl. No.: 489,299

[22] Filed: Apr. 28, 1983

[30] Foreign Application Priority Data

May 4, 1982 [JP] Japan ................................ 57-74821
May 4, 1982 [JP] Japan ................................ 57-74822

[51] Int. Cl.[3] ............................................ G01D 15/18
[52] U.S. Cl. ................................ 346/75; 346/140 R
[58] Field of Search ............................ 346/75, 140 R

[56] References Cited

U.S. PATENT DOCUMENTS

| | | | |
|---|---|---|---|
| 3,805,276 | 4/1974 | Ishii | 346/140 R |
| 3,971,039 | 7/1976 | Tauaro et al. | 346/75 |
| 4,301,459 | 11/1981 | Isayama et al. | 346/140 R |
| 4,314,264 | 2/1982 | Bou et al. | 346/140 R |
| 4,399,446 | 8/1983 | McCann et al. | 346/140 R |
| 4,429,320 | 1/1984 | Hastori et al. | 346/140 R |
| 4,460,904 | 7/1984 | Oszczakiewicz et al. | 346/75 |

*Primary Examiner*—E. A. Goldberg
*Assistant Examiner*—Gerald E. Preston
*Attorney, Agent, or Firm*—David G. Alexander

[57] ABSTRACT

An apparatus for removing air from ink which is fed under pressure to a nozzle of an ink ejection head is disclosed. A first solenoid-operated valve is disposed between an ink pressurizing source and the nozzle. Located between the valve and the nozzle is a deaerating unit which has therein a bore for causing air entrained by the ink to surface. An air outlet is formed in an upper portion of the bore and opened and closed by a second solenoid-operated valve. Upon a stop of ink ejection, the first valve is closed (ink supply blocked) while the second valve is opened. Heaters are installed in the bore of the deaerating unit to heat ink inside the bore to a predetermined temperature, so that air in the ink is expanded to become readily separable from the ink.

14 Claims, 13 Drawing Figures

INK JET DEAERATION APPARATUS

BACKGROUND OF THE INVENTION

The present invention relates to an ink jet printer which ejects pressurized ink from an ink ejection head or nozzle to print out characters or like data on a sheet of paper and, more particularly, to an apparatus for removing air which may be entrained by the ink fed to the ink ejection head.

In an ordinary ink jet printer, ink is fed under pressure to an ink ejection head and pressure oscillation of a given frequency and amplitude is applied to the ink ejection from a nozzle of the head. As soon as the ink jet separates into a droplet, it is effected by an electric field to be charged thereby and then deflected by a deflecting electric field to impinge on a paper sheet.

Ink in this type of printer is apt to entrain air before reaching the ink ejection head. Air contained in the ink would disturb or practically disenable ink ejection and thereby prevent droplets from being regularly formed at predetermined intervals and each with a predetermined amount, thus effecting the quality of the resulting images on the paper sheet. An implement heretofore known for solving this problem comprises an air collector which is communicated through a valve to an ink passageway, which extends from the ink pressurizing source to the nozzle, so that air accumulated in an upper section of the ink passageway may be gathered in the air collector (as disclosed in Japanese Patent Publication Nos. 52-15178/77 and 52-15333/77). However, once the air collector becomes filled up with air, no more air can be accommodated therein. Replacement of the air collector or the discharge of air from the air collector requires disproportionate time and labor and even the chance may be lost. Concerning Japanese Patent Publication No. 52-15178/77, another drawback is that the ink continuously outflows from the nozzle over a substantial period of time even after the deactivation of a pump, thereby smearing various structural elements around the nozzle. As to Japanese Patent Publication No. 52-15333/77, on the other hand, it requires a number of structural elements as represented by three sets of valves.

Meanwhile, the ink temperature effects the ink viscosity and thereby the mass of an ink droplet as well as the amount of charge deposited thereon, which as a whole will vary the amount of deflection. It is therefore desirable to maintain the ink at a constant temperature and this has been implemented by a heater which is installed in an ink reservoir or in an ink passageway. Preferably, the heater should be located as close to the head as possible.

SUMMARY OF THE INVENTION

It is therefore an object of the present invention to provide an apparatus which efficiently and automatically expels air which may be contained in ink supplied under pressure to an ink ejection head of an ink jet printer.

It is another object of the present invention to provide an ink jet printer which, aided by the apparatus of the type described, is capable of preventing ink from dripping from the nozzle of the ink ejection head once the communication of the head with an ink pressurizing source is shut off.

It is another object of the present invention to provide a generally improved deaeration apparatus for pressurized ink in an ink jet printer.

An apparatus for removing air from ink fed under pressure from an ink pressurizing source to an ink ejection nozzle embodying the present invention includes a first valve disposed in an ink passageway, which extends between the ink pressurizing source and the ink ejection nozzle. A deaerating unit is located in an ink passageway between the first valve and the nozzle. The deaerating unit having an ink inlet port communicating to an outlet port of the first valve, an ink outlet port communicating to the nozzle and an air outlet port which is formed in an upper portion of a bore thereof. A second valve selectively opens and closes the air outlet port of the deaerating unit. Control means controls the first and second valves to selectively open and close the valves each at a predetermined timing.

In accordance with the present invention, an apparatus for removing air from ink which is fed under pressure to a nozzle of an ink ejection head is disclosed. A first solenoid-operated valve is disposed between an ink pressurizing source and the nozzle. Located between the valve and the nozzle is a deaerating unit which has therein a bore for causing air entrained by the ink to surface. An air outlet is formed in an upper portion of the bore and opened and closed by a second solenoid-operated valve. Upon a stop of ink ejection, the first valve is closed (ink supply blocked) while the second valve is opened. Heaters are installed in the bore of the deaerating unit to heat ink inside the bore to a predetermined temperature, so that air in the ink is expanded to become readily separable from the ink.

The above and other objects, features and advantages of the present invention will become apparent from the following detailed description taken with the accompanying drawings.

DESCRIPTION OF THE PREFERRED EMBODIMENTS

While the deaeration apparatus for pressurized ink in an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
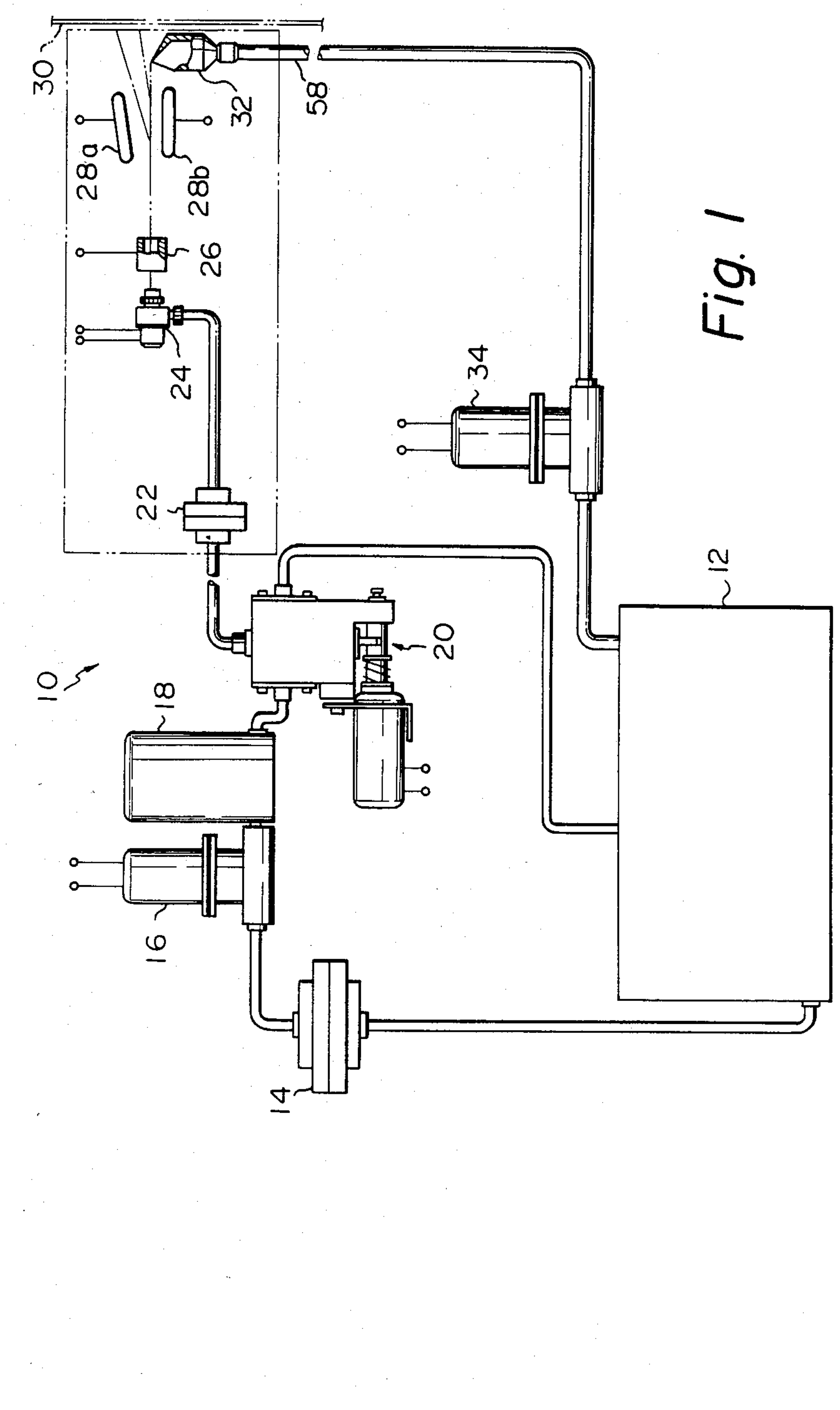
FIG. 1 is a system diagram showing essential part of a prior art ink jet printer.

Referring to FIG. 1 of the drawings, an ink jet printer to which the present invention is applicable is shown and generally designated by the reference numeral 10. The printer 10 includes an ink reservoir 12 and a pump 16 adapted to feed ink under pressure from the reservoir 12 to an accumulator 18 via a filter 14. The accumulator 18 serves to absorb pressure oscillation due to the actions of the pump 16. The ink under constant pressure from the accumulator 18 is delivered to an ink ejection head 24 via a solenoid-operated valve 20 and a filter 22. In the head 24, an electrostrictive vibrator is driven at a predetermined frequency to apply pressure oscillation of a given frequency to the ink whereby, at a position spaced a given distance from a nozzle of the head 24, the ink jet from the nozzle is separated into a droplet. A charging electrode 26 is located at the jet-to-droplet separation position of the ink. When a charging voltage is applied across the charging electrode 26 at the instant a droplet is formed, the droplet will be charged to a polarity opposite to that of the charging voltage. Deflection electrodes **28*a* and 28*b* develop an electric field therebetween which will deflect the charged droplet toward a sheet of a paper 30. Meanwhile, noncharged droplets will be caught by a gutter 32 and forcibly fed by a pump 34 back into the reservoir 12. The structural elements enclosed by a dots-and-dash line in FIG. 1** are mounted on a carriage. Although not shown in the drawing, a charge detection electrode is located on the carriage or in the vicinity of an end of a platen for the purpose of detecting ink droplets or the charged state of ink droplets during phase search or deflection setting.

While a printing operation is in preparation or under way, the valve 20 is energized to set up communication between the accumulator 18 and the filter 22 while blocking the path to the reservoir 12. When the pump 16 is deactevated, the valve 20 will be deenergized to communicate the filter 22 to the reservoir 12 while blocking the path from the accumulator 18. The ink coming out from the accumulator 18, therefore, will be stopped as soon as the pump 16 is deactivated. This will lower the pressure inside an ink chamber of the head 24 to that of the reservoir 12 (atmospheric pressure) and thereby quickly cut off the ink ejection to entail a minimum of dripping.

Figure 2:
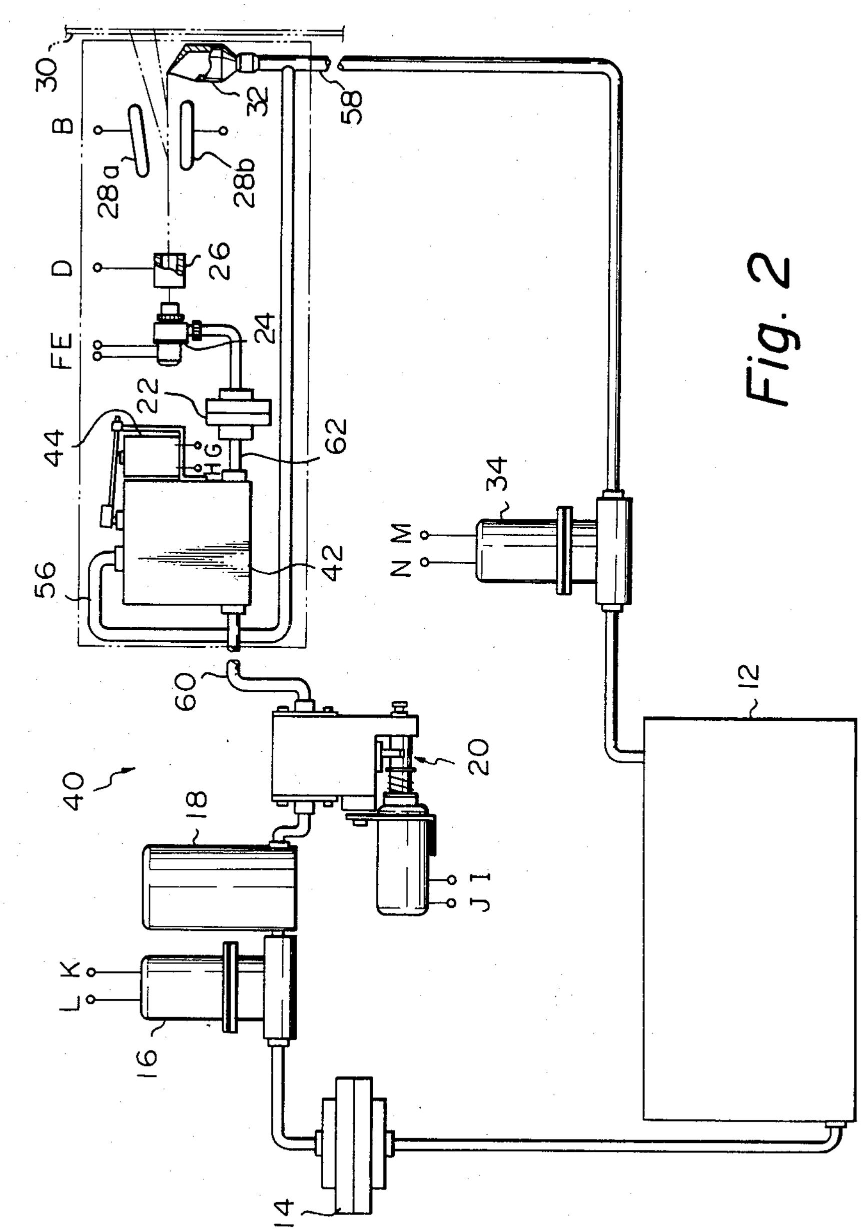
FIG. 2 is a system diagram showing essential part of an ink jet printer to which the present invention is applied.

Referring to FIG. 2, there is shown an ink jet printer 40 which has employed advantageous features of the present invention. In FIG. 2, the same reference numerals as those of FIG. 1 designate the same structural elements. As shown, the first solenoid-operated valve 20 is communicated to the accumulator 18. A deaerating unit 42 is located between the valve 20 and the filter 22. A second solenoid-operated valve 44 is mounted on the deaerating unit 42. The rest of the mechanical structure shown in FIG. 2 is similar to that of the prior art shown in FIG. 1.

Figure 3:
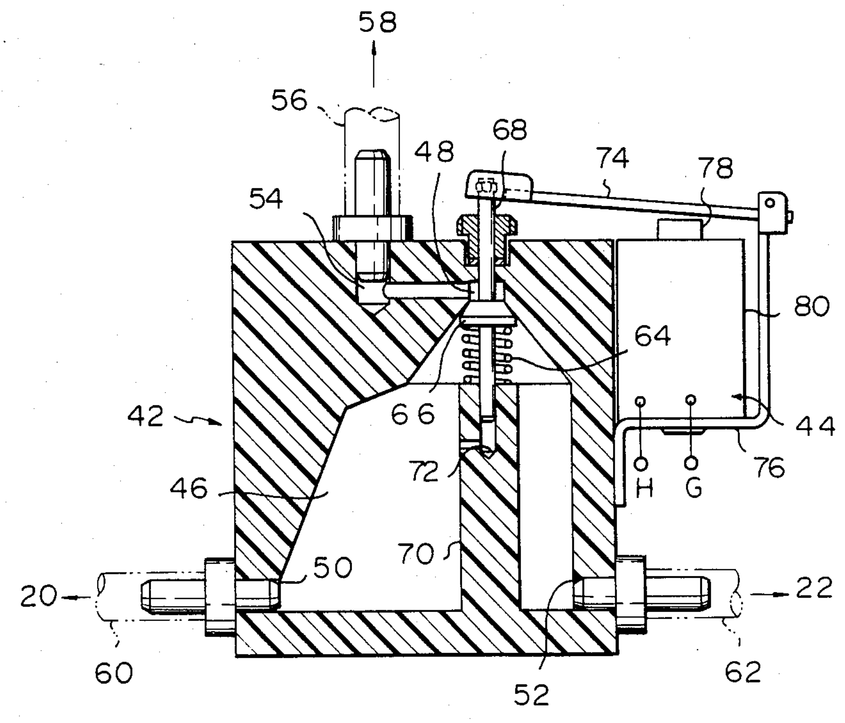
FIG. 3 is an enlarged section of a deaerating unit and its associated solenoid-operated valve in accordance with the present invention.

As shown in detail in FIG. 3, the deaerating unit 42 has a bore 46 which communicates to an air outlet port 48 at upper part thereof and to an ink inlet port 50 and an ink outlet port 52 at lower part thereof. The air outlet 48 connects to a passageway 54 which in turn connects to an ink collection conduit 58 of the gutter 32 via a conduit 56. The ink inlet 50 is communicated by a conduit 60 to a delivery port of the first valve 20, while the ink outlet 52 is communicated by a conduit 62 to the filter 22. The deaerator 42 is mounted on a carriage of the printer together with the valve 44 and the ink ejection head 24. A valve member 66 is constantly urged upwardly by a compression spring 64 to stop the air outlet 48. A rod 68, with which the valve member 66 is integral, has a lower end which is movably fit in a bore formed in the center of an upper portion of a cylindrical guide 70, which stands upright from the bottom of the deaerator 42. The upper end of the rod 68 extends to the outside through an O-ring and a nut as illustrated. An arm 74 made of a magnetic material is connected at one end to the top of the rod 68 and pivotted at the other end to the free end of a yoke 76, which is also made of a magnetic material. The yoke 76 rigidly carries therewith the lower end of a magnetic core 78 around which a coil 80 is wound. The arm 74 is located to face the top of the magnetic core 78. In this construction, when a current larger than predetermined one is fed to the coil 80 to energize it, the arm 74 will become magnetically attracted into contact with the top of the core 78 to urge the rod 68 downwardly and thereby cause the valve member 66 to unblock the air outlet 48. If the pressure of ink and/or air inside the bore 46 is higher than the atmospheric level, the ink and/or air will be routed to the collection conduit 58 via the air outlet 48, passageway 54 and conduit 56 and forced therefrom to the reservoir 12 by the pump 34. It will be seen that, if ink is present in the bore 46, if the neighborhood of the valve member 66 is occupied by air and if the pressure inside the bore 46 is higher than the atmospheric level, then the air and, following it, the ink will flow out into the conduit 58 when the valve member 66 is shifted downwardly by the arm 74.

Figure 4:
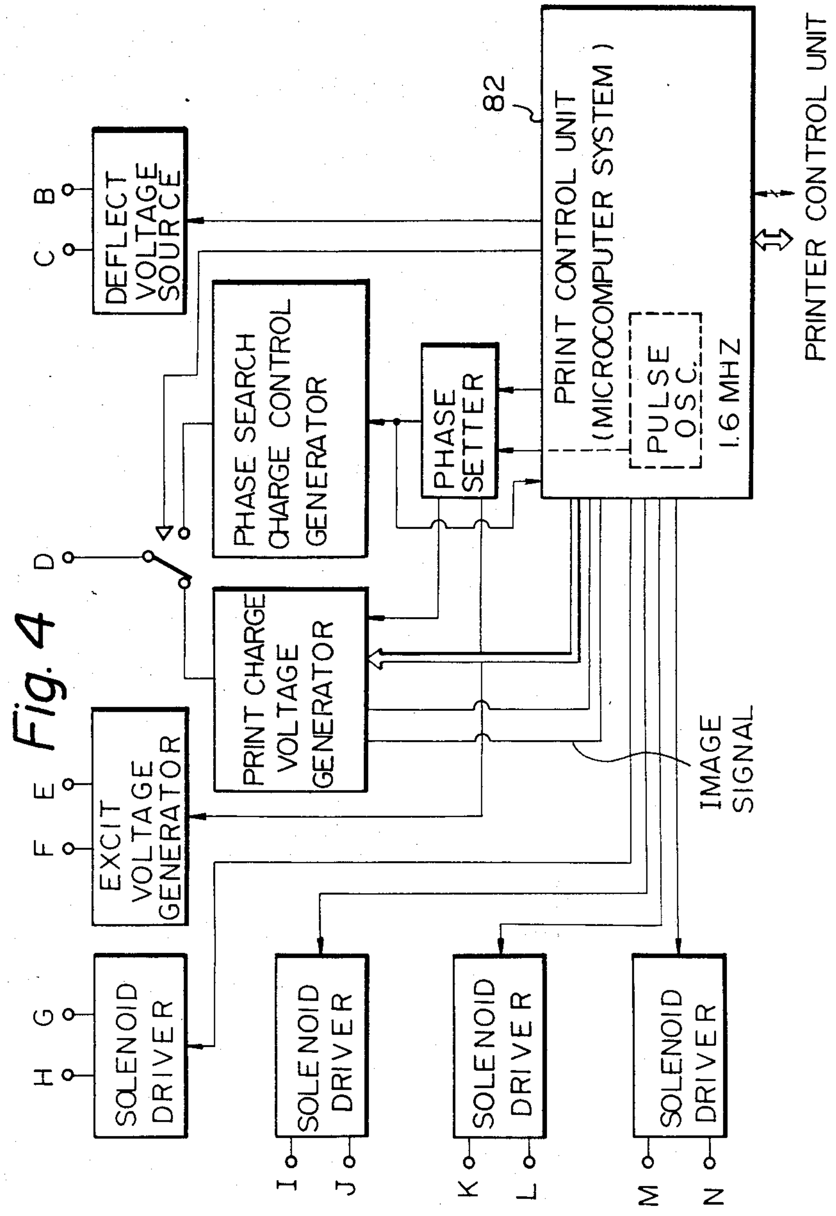
FIG. 4 is a block diagram of a control system for the ink jet printer.

Connected to terminals B-N shown in FIG. 2 are various electric circuits shown in FIG. 4. It should be noted here that the intermediate terminals B-N do not constitute any essential part of the present invention and may be omitted if desired. A print control unit 82 shown in FIG. 4 selectively activates and deactivates the pumps 16 and 34 and valves 20 and 44 and, additionally, performs various controls for phase search, deflection setting and printout operations, e.g. controlling the operation of the vibrator associated with the head 24, application of a charging voltage to the electrode 26 and that of a deflection voltage.

Figure 5:
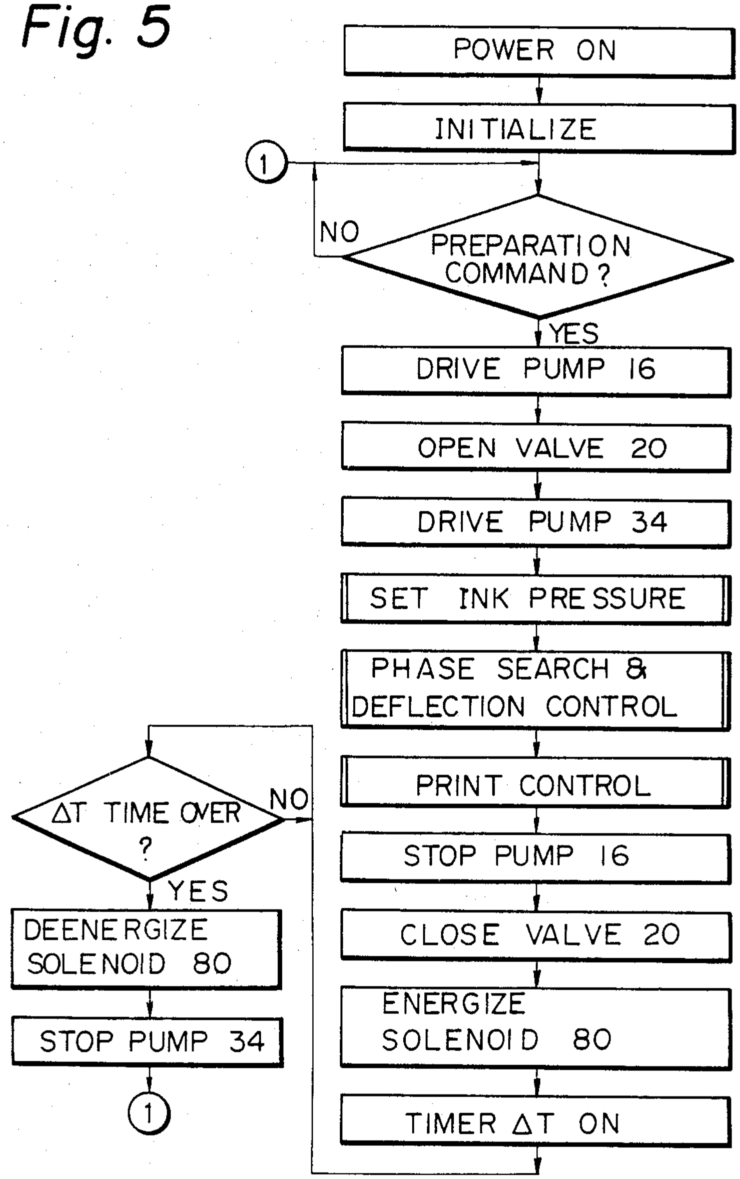
FIG. 5 is a flowchart representing the operation of the control system.

Referring to FIG. 5, a flowchart representing the operation of the print control unit 82 is shown. When power is supplied to the unit 82, it will initialize input/output ports and input/output registers to set up the condition "INITIALIZE" shown in Table 1.

TABLE 1

| | STATUS | | | | | | |
|---|---|---|---|---|---|---|---|
| ELEMENT | INITIALIZE | PREPARE | PHASE SEARCH | DEFLECTION CONTROL | PRINT | STOP 1 | STOP 2 |
| PUMP 16 | off | on | on | on | on | off | off |

TABLE 1-continued

| ELEMENT | STATUS INITIALIZE | PREPARE | PHASE SEARCH | DEFLECTION CONTROL | PRINT | STOP 1 | STOP 2 |
|---|---|---|---|---|---|---|---|
| PUMP 34 | off | on | on | on | on | on | off |
| VALVE 20 | close | open | open | open | open | close | close |
| VALVE 44 | close | close | close | close | close | open | close |
| DEFLECT ELECTRODES 28a, 28b | no voltage | no voltage | voltage | voltage | voltage | no voltage | no voltage |
| VIBRATOR AT HEAD 24 | off | on | on | on | on | off | off |

Next, the print control unit 82 waits for a preparation command which will soon be fed thereto from a control unit (not shown). In response to the preparation command, the unit 82 drives the pump 16, opens the valve 20, drives the pump 34 and energizes the vibrator at the head 24 as indicated in the status "PREPARE" in Table 1. Then, ink is ejected form the head 24 to impinge on the gutter 32, forced by the pump 34 back to the reservoir 12 and then forced by the pump 16 under pressure to the accumulator 18. During such ejection and circulation of the ink, the ink pressure in the accumulator 18 will become stable in due course. The unit 82 detects the stabilized ink pressure and controls it to a predetermined level, thereafter performing the "PHASE SEARCH" and "DEFLECTION CONTROL" sequentially. Under this condition, the unit 82 sends a ready signal to the printer control unit and controls the printing operation in response to a command which will be returned thereto from the printer control unit. As an end print signal is supplied from the printer control unit, the unit 82 deactivates the pump 16, closes the valve 20, opens the valve 44, and sets a time $\Delta T$ in a timer (programmable timer), status "STOP 1". This deactivates the pump 16 and closes the valve 20 to interrupt the ink supply to the accumulator 18 as well as the outflow of ink therefrom. At the same time, the valve member 66 of the valve 44 is lowered to unblock the air outlet 48 of the deaerator 42 so that air and ink in the bore 46 is allowed to flow into the collection conduit 58 via the air outlet 48, passageway 54 and conduit 56. The result will be the sharp drop of the pressure inside the deaerator 42. As the pressure coincides with the pressure inside the gutter 32, i.e., the atmospheric pressure, the ink ejection from the head 24 is stopped and so is the outflow of ink from the air outlet 48. The timer time $\Delta T$ will be over after the stop of the ink ejection and the unit 82 will close the valve 44 and deactivate the pump 34, status "STOP 2".

By the operation of the control unit 82 described above, air separated from the ink and accumulated in an upper portion of the bore 46 before a start of ink ejection and during the interval between it and an end of ink ejection, will be discharged from the bore 46 into the conduit 58 (atmospheric pressure) upon the stop of ink ejection. Moreover, closing the valve 44 at the instant of the stop of ink ejection will sharply lower the pressure in the passageway between the valve 20 and the nozzle of the head 24, thereby interrupting the outflow of the ink from the nozzle within a short period of time after closing of the valve 20.

Figure 6:
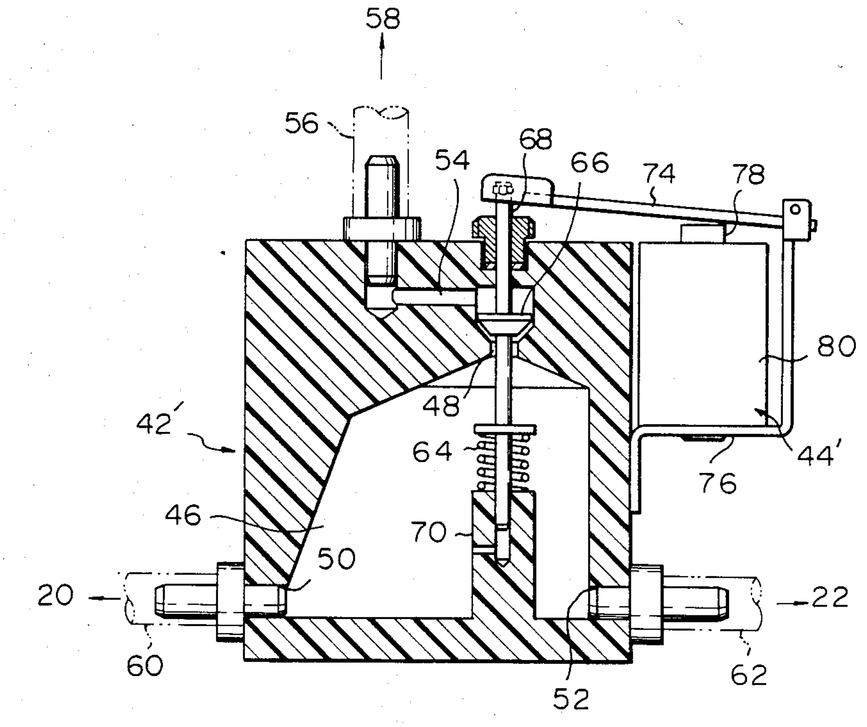
FIG. 6 is an enlarged section of another possible form of the deaerating unit and associated valve in accordance with the present invention.

Referring to FIG. 6, a deaerator 42' and its associated second valve 44' are shown which are employed for another embodiment of the present invention. As shown, a coil spring 64 constantly urges a valve member 66 in a direction for unblocking the air outlet 48. When a coil 80 is energized, the valve 66 will be moved downwardly to block the air outlet 48 against the action of the spring 64 and through the mechanical linkage described. In this particular embodiment, the print control unit 82 energizes the coil 80 to block the air outlet 48 (close the second valve 44') when the ink is to be ejected.

Figure 7:
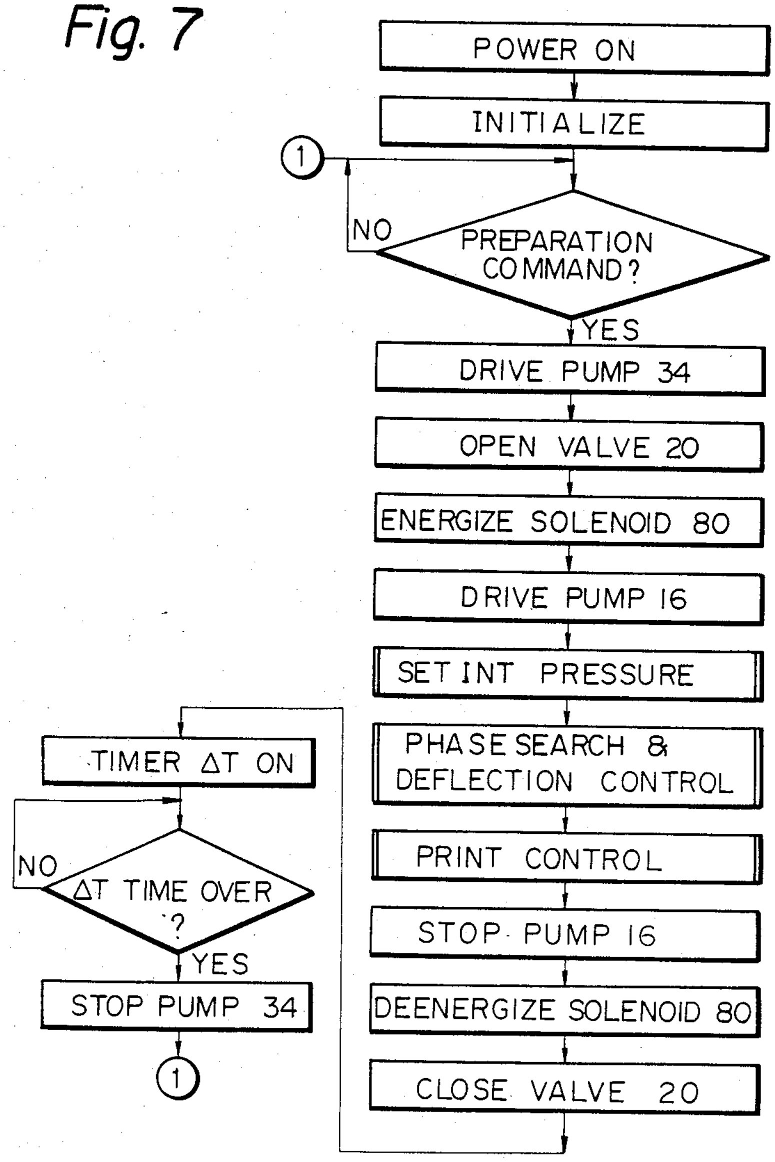
FIG. 7 is a flowchart representing the operation of the control system associated with the deaerating unit of FIG. 6.

The operation of the print control unit 82 in the embodiment shown in FIG. 6 will be understood from the flowchart of FIG. 7 and Table 2 shown below.

TABLE 2

| | STATUS INITIALIZE | PREPARE | PHASE SEARCH | DEFLECTION CONTROL | PRINT | STOP 1 | STOP 2 |
|---|---|---|---|---|---|---|---|
| PUMP 16 | off | on | on | on | on | off | off |
| PUMP 34 | off | on | on | on | on | on | off |
| VALVE 20 | close | open | open | open | open | close | close |
| VALVE 44' | open | close | close | close | close | open | open |
| DEFLECT ELECTRODES 28a, 28b | no voltage | no voltage | voltage | voltage | voltage | no voltage | no voltage |
| VIBRATOR AT HEAD 24 | off | on | on | on | on | off | off |

In this embodiment, the print control unit 82 closes (energizes) the second valve 44' when it opens the first valve 20 (for ejection) and opens the second 44' when it closes the first 20 (for stopping ejection). While the second valve 44' is kept open, the bore 46 of the deaerator 42' is communicated to the conduit 58 to discharge the air. The second valve 44' is closed at a short delay after the closing of the first valve 20 and, during this delay, the ink pressure at the accumulator 18 is communicated to the bore 46 of the deaerator 42' so that the air and ink are forced from the bore 46 into the conduit 58. Upon the stop of ink ejection, air and ink will be expelled in the same manner to quickly cut off the outflow of the ink from the nozzle.

Figure 8:
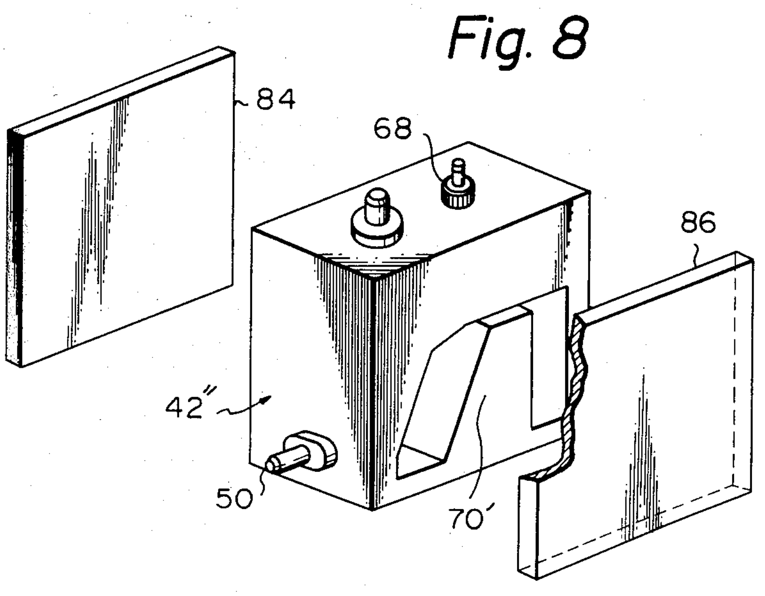
FIG. 8 is an exploded perspective view of another possible form of the deaerating unit in accordance with the present invention.

Referring to FIG. 8, a deaerator 42" designed to promote more effective separation of air from the ink is illustrated. The deaerator 42" includes a guide 70' in the form of an upright wall which spans the distance between opposite side plates 84 and 86 of the deaerator. In this construction, ink entered the deaerator 42″ from the ink inlet will first flow upwardly along the wall 70′, then over the top of the wall 70′ in an upper portion of the bore and finally down along the wall 70′ to reach the ink outlet. In the course of such upward flow of the ink to the top of the wall 70′, air entrained thereby will surface to accumulate in the neighborhood of the valve member.

Figure 9:
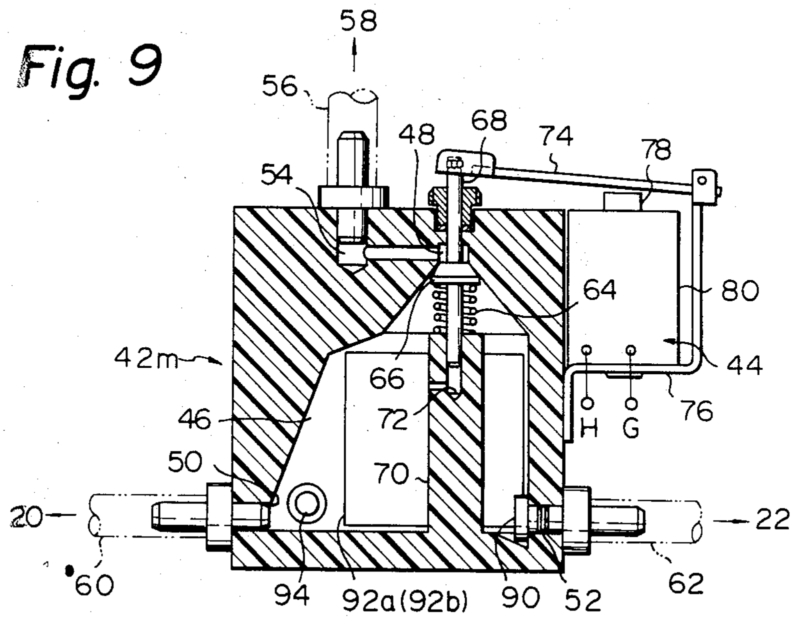
FIG. 9 is a view of a modification to the construction shown in FIG. 3.
Figure 10:
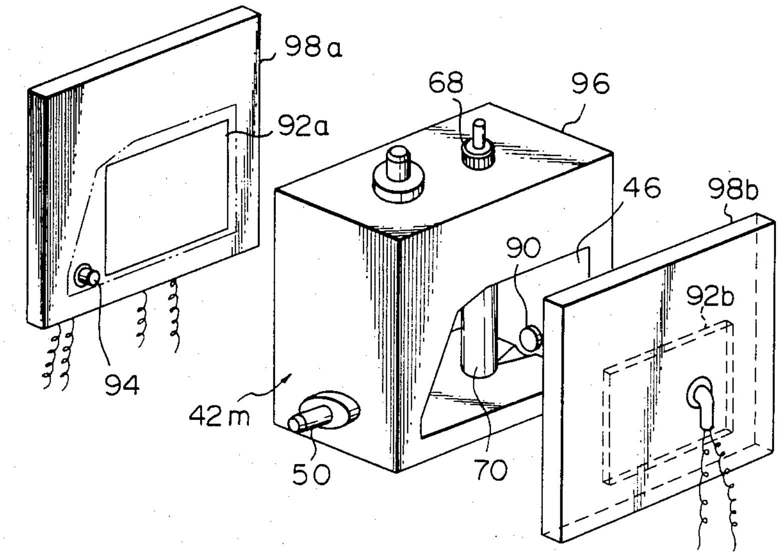
FIG. 10 is an exploded perspective view of a modification to the construction shown in FIG. 9.
Figure 11:
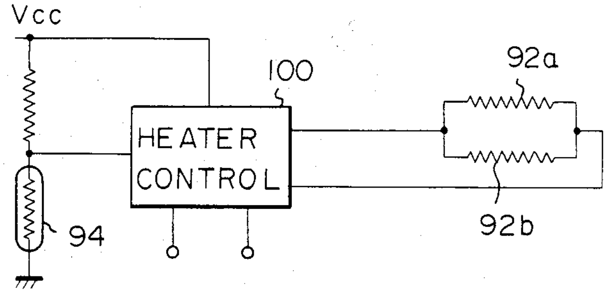

A modification to the deaerator 42 described with reference to FIG. 3 is shown in FIG. 9. The modified deaerator 42*m* shown in FIG. 9 includes a filter 90 which is located at the ink outlet 52 inside the bore 46. The filter 90 makes the filter 22 shown in FIG. 2 omissible. Flat heaters 92*a* and 92*b* are disposed to face the bore 46, while a thermistor 94 is positioned in a portion of the bore 46 adjacent to the bottom. In detail, as best shown in FIG. 10, the deaerator 42*m* comprises a housing 96 having the bore 46 thereinside, and side plates 98*a* and 98*b* adapted to close the opposite sides of the bore 46. The flat heaters 92*a* and 92*b* are respectively mounted on those surfaces of the side plates 98*a* and 98*b* which face the bore 46. The thermistor 94 is mounted in a lower portion of the side plate 98*a*. The side plates 98*a* and 98*b* are individually connected by an adhesive to the opposite sides of the housing 96, thereby defining the bore 46 in cooperation with the housing 96. As shown in FIG. 11, the heaters 92*a* and 92*b* and thermistor 94 are electrically connected to a heater controller 100. As long as the power source of the printer is turned on, the heater controller 100 controls the heaters 92*a* and 92*b* such that the bore 46 is maintained at a predetermined temperature.

In the modified deaerator 42*m*, the heaters 92*a* and 92*b* heat the ink up to a predetermined level during ink ejection. The heat expands air contained in the ink and thereby separates it from the ink. The separated ink accumulates in an upper portion of the bore 46 inside the deaerator 42*m* and, as soon as the second valve is opened, rushes to the outside. It will be seen that the deaerator 42*m* makes it needless to install a heater in a passageway remote from the ink ejection head, maintains the ink at a constant pressure, and promotes efficient removal of air from the ink.

Figure 12:
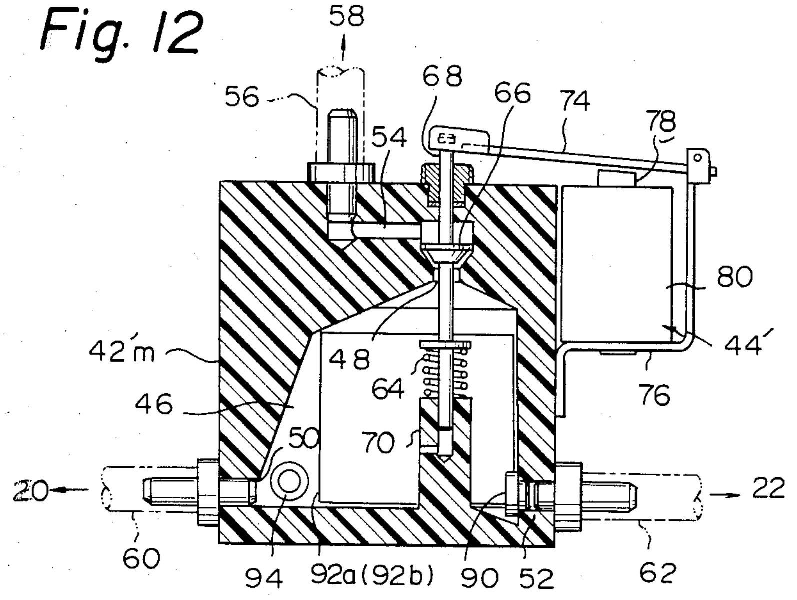
FIGS. 12 and 13 are views of modifications to the constructions shown in FIGS. 6 and 8 respectively.
Figure 13:
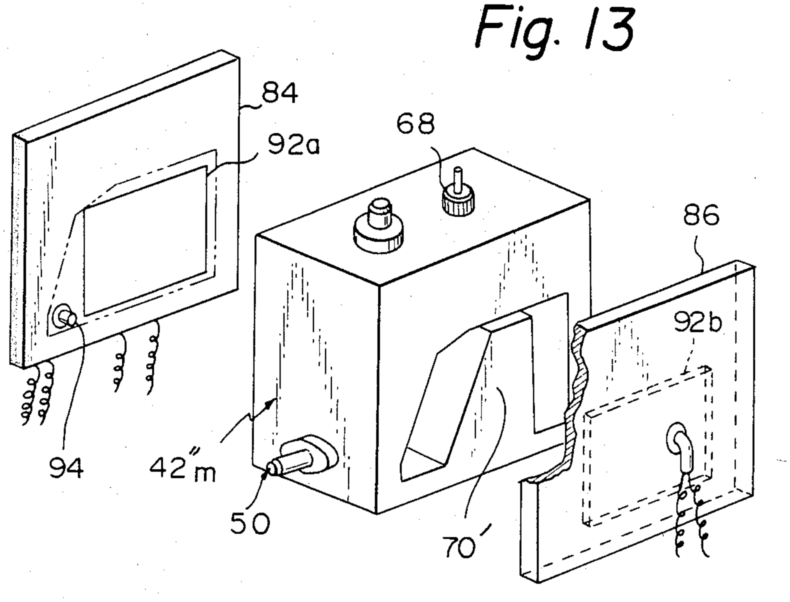

Shown in FIGS. 12 and 13 are, respectively, modifications to the embodiments shown in FIGS. 6 and 8 and each having the heaters 92*a* and 92*b* and a thermistor 94 therein.

The operations and controls associated with the modified deaerators shown in FIGS. 12 and 13 are essentially common to those associated with the embodiments of FIGS. 6 and 8 and, therefore, will not be described herein for simplicity.

Various modifications will become possible for those skilled in the art after receiving the teachings of the present disclosure without departing from the scope thereof.

What is claimed is:

1. An apparatus for removing air from ink which is fed under pressure from an ink pressurizing source to an ink ejection nozzle, comprising:

- a first valve disposed in an ink passageway which extends between the ink pressurizing source and the ink ejection nozzle;
- a deaerating unit located in an ink passageway between said first valve and the nozzle, said deaerating unit having an ink inlet port communicating to an outlet port of the first valve, an ink outlet port communicating to the nozzle and an air outlet port which is formed in upper part of a bore thereof;
- a second valve for selectively opening and closing said air outlet port of the deaerating unit; and
- control means for maintaining the first valve open and the second valve closed during ink ejection printing operation of the apparatus;
- the control means closing and maintaining the first valve closed and opening the second valve for a predetermined length of time to terminate the ink ejection printing operation and allow air to escape from said deaerating unit through the air outlet port.

2. An apparatus as claimed in claim 1, in which the second valve comprises a valve member, spring means for constantly biasing said valve member in a direction for closing the air outlet port, and a solenoid-operated device for driving the valve member in a direction for opening the air outlet when energized.

3. An apparatus as claimed in claim 1, in which the second valve comprises a valve member, spring means for constantly biasing said valve member in a direction for opening the air outlet port, and a solenoid-operated device for driving the valve member in a direction for closing the air outlet when energized.

4. An apparatus as claimed in claim 3, in which the control means is constructed to control the second valve to close when the first valve is switched from a closed position to an open position thereof.

5. An apparatus as claimed in claim 1, further comprising a carriage on which are mounted the deaerating unit, the second valve and the ink ejection nozzle.

6. An apparatus as claimed in claim 5, further comprising an ink collection passageway, the air outlet port of the deaerating unit being communicated to said ink collection passageway on the carriage.

7. An apparatus as claimed in claim 1, in which the deaerating unit comprises a housing for defining the bore, said housing having a guide member which extends upright from the bottom of the bore toward the air outlet port in order to support and guide the second valve.

8. An apparatus as claimed in claim 7, in which the guide member has a cylindrical configuration.

9. An apparatus as claimed in claim 7, in which the guide member is shaped to define an ink passageway in the deaerating unit in which ink flows upwardly from the ink inlet port toward the air outlet port and then downwardly from the air outlet port toward the ink outlet port.

10. An apparatus as claimed in claim 1, in which the deaerating unit comprises a heater disposed in the bore to heat ink inside the bore to a predetermined temperature.

11. An apparatus as claimed in claim 7, in which the deaerating unit further comprises a side wall portion which defines the bore in cooperation with the housing.

12. An apparatus as claimed in claim 11, in which a heater is mounted on the side wall portion to heat ink inside the bore to a predetermined temperature.

13. An apparatus as claimed in claim 12, in which a thermistor is mounted in the side wall portion.

14. An apparatus as claimed in claim 1, in which a filter is located at the ink outlet port within the bore.

* * * * *